US012615488B2

(12) United States Patent
Laaksonen et al.

(10) Patent No.: US 12,615,488 B2
(45) Date of Patent: Apr. 28, 2026

(54) APPARATUS, METHOD, AND COMPUTER PROGRAM FOR ADJUSTING NOISE CONTROL PROCESSING

(71) Applicant: Nokia Technologies Oy, Espoo (FI)

(72) Inventors: Lasse Juhani Laaksonen, Tampere (FI); Miikka Tapani Vilermo, Tampere (FI); Arto Juhani Lehtiniemi, Tampere (FI)

(73) Assignee: Nokia Technology Oy, Espoo (FI)

( * ) Notice: Subject to any disclaimer, the term of this patent is extended or adjusted under 35 U.S.C. 154(b) by 155 days.

(21) Appl. No.: 18/591,802

(22) Filed: Feb. 29, 2024

(65) Prior Publication Data

US 2024/0323635 A1 Sep. 26, 2024

(30) Foreign Application Priority Data

Mar. 24, 2023 (EP) .................................... 23163911

(51) Int. Cl.
*H04S 7/00* (2006.01)

(52) U.S. Cl.
CPC .................................. *H04S 7/304* (2013.01)

(58) Field of Classification Search
CPC ....... G10K 11/17857; G10K 11/17881; G10K 2210/505; H04S 7/304; H04S 7/301; H04S 7/303; H04S 7/305; G01H 7/00; H04R 2227/007
USPC ........................................................ 381/303
See application file for complete search history.

(56) References Cited

U.S. PATENT DOCUMENTS

| | | | | |
|---|---|---|---|---|
| 10,609,475 | B2 | 3/2020 | Benattar | |
| 2008/0019535 | A1 | 1/2008 | Mitsuhashi et al. | |
| 2008/0232603 | A1 * | 9/2008 | Soulodre | H04S 7/305 381/63 |

FOREIGN PATENT DOCUMENTS

| | | | | |
|---|---|---|---|---|
| EP | 3672274 A1 | | 6/2020 | |
| WO | WO-2014091375 A1 | * | 6/2014 | H04S 7/305 |

OTHER PUBLICATIONS

Extended European Search Report received for corresponding European Patent Application No. 23163911.3, dated Sep. 4, 2023, 8 pages.

* cited by examiner

*Primary Examiner* — Paul Kim
(74) *Attorney, Agent, or Firm* — McCarter & English, LLP

(57) ABSTRACT

Examples of the disclosure relate to enabling external control of noise control processing. In examples of the disclosure a location of a listener is determined. The listener is listening to audio content and the audio content is processed using noise control processing. An acoustic response at the location of the listener is determined and a control signal is provided. The control signal indicates an adjustment for one or more parameters of the noise control processing, and the adjustment is based, at least in part, on the acoustic response at the location of the listener.

20 Claims, 8 Drawing Sheets

APPARATUS, METHOD, AND COMPUTER PROGRAM FOR ADJUSTING NOISE CONTROL PROCESSING

TECHNOLOGICAL FIELD

Examples of the disclosure relate to an apparatus, method, and computer program for adjusting noise control processing. Some relate to an apparatus, method and computer program for enabling external control of noise control processing.

BACKGROUND

Noise control processing can be used to reduce unwanted noise or to enhance certain sounds for a listener using earphones or other similar audio playback devices. For example, active noise cancellation (ANC) can be used to reduce unwanted noise or a pass-through or transparency mode can be used to enable a listener to hear external sounds.

BRIEF SUMMARY

According to various, but not necessarily all, examples of the disclosure, there is provided an apparatus comprising means for:

determining a location of a listener wherein the listener is listening to audio content and the audio content is processed using noise control processing;

determining an acoustic response at the location of the listener; and providing a control signal wherein the control signal indicates an adjustment for one or more parameters of the noise control processing, and wherein the adjustment is based, at least in part, on the acoustic response at the location of the listener.

The acoustic response at the location of the listener may be determined from at least one of:

a model of an environment comprising the location of the listener;

measurements made at the location of the listener.

The acoustic response may comprise, at least, reverberation characteristics

The means may also be for providing a control signal indicating a temporary adjustment of the one of more parameters of the noise control processing wherein the temporary adjustment is based on a change in one or more characteristics of the audio content.

The temporary adjustment of the one of more parameters of the noise control processing may be made based on detected changes in one or more characteristics of the audio content.

One or more characteristics of the audio content may comprise loudness.

The one or more parameters of the noise control processing may be adjusted for a subset of frequencies of the audio content.

The one or more parameters of the noise control processing that are adjusted may comprise at least one of:

level;

cross over frequency.

The control processing may comprise at least one of:

active noise cancellation;

transparency processing.

According to various, but not necessarily all, examples of the disclosure, there is provided an electronic device comprising an apparatus as described herein wherein the electronic device comprises at least one of:

a server, a rendering device.

According to various, but not necessarily all, examples of the disclosure, there is provided a method comprising:

determining a location of a listener wherein the listener is listening to audio content and the audio content is processed using noise control processing; determining an acoustic response at the location of the listener;

providing a control signal wherein the control signal indicates an adjustment for one or more parameters of the noise control processing wherein the adjustment is based, at least in part, on the acoustic response at the location of the listener.

According to various, but not necessarily all, examples of the disclosure, there is provided a computer program comprising program instruction which, when executed by an apparatus, cause the apparatus to perform:

determining a location of a listener wherein the listener is listening to audio content and the audio content is processed using noise control processing; determining an acoustic response at the location of the listener;

providing a control signal wherein the control signal indicates an adjustment for one or more parameters of the noise control processing wherein the adjustment is based, at least in part, on the acoustic response at the location of the listener.

According to various, but not necessarily all, examples of the disclosure, there is provided an apparatus comprising means for:

processing audio content using noise control processing;

enabling playback of the processed audio content to a listener;

receiving a control signal from another device wherein the control signal indicates adjustments for the one or more parameters of the noise control processing, and wherein the adjustment is based, at least in part, on an acoustic response at the location of the listener; and adjusting the one or more parameters of the noise control processing based at least in part on the received control signal.

The means may also be for receiving a control signal from the another device wherein the control signal indicates a temporary adjustment for the one of more parameters of the noise control processing based on a change in one or more characteristics of the audio content.

According to various, but not necessarily all, examples of the disclosure, there is provided an electronic device comprising an apparatus as described herein wherein the electronic device comprises at least one of:

a listener device;

a playback device.

According to various, but not necessarily all, examples of the disclosure, there is provided a method comprising:

processing audio content using noise control processing;

enabling playback of the processed audio content, by a first device, to a listener;

receiving a control signal from another device wherein the control signal indicates adjustments for the one or more parameters of the noise control processing; and wherein the adjustment is based, at least in part, on an acoustic response at the location of the listener, and adjusting the one or more parameters of the noise control processing based at least in part on the received control signal.

According to various, but not necessarily all, examples of the disclosure, there is provided a computer program comprising program instruction which, when executed by an apparatus, cause the apparatus to perform:

processing audio content using noise control processing; enabling playback of the processed audio content to a listener;

receiving a control signal from another device wherein the control signal indicates adjustments for the one or more parameters of the noise control processing; and wherein the adjustment is based, at least in part, on an acoustic response at the location of the listener, and adjusting the one or more parameters of the noise control processing based at least in part on the received control signal.

While the above examples of the disclosure and optional features are described separately, it is to be understood that their provision in all possible combinations and permutations is contained within the disclosure. It is to be understood that various examples of the disclosure can comprise any or all of the features described in respect of other examples of the disclosure, and vice versa. Also, it is to be appreciated that any one or more or all of the features, in any combination, may be implemented by/comprised in/performable by an apparatus, a method, and/or computer program instructions as desired, and as appropriate.

BRIEF DESCRIPTION

Some examples will now be described with reference to the accompanying drawings in which.

Figure 1:
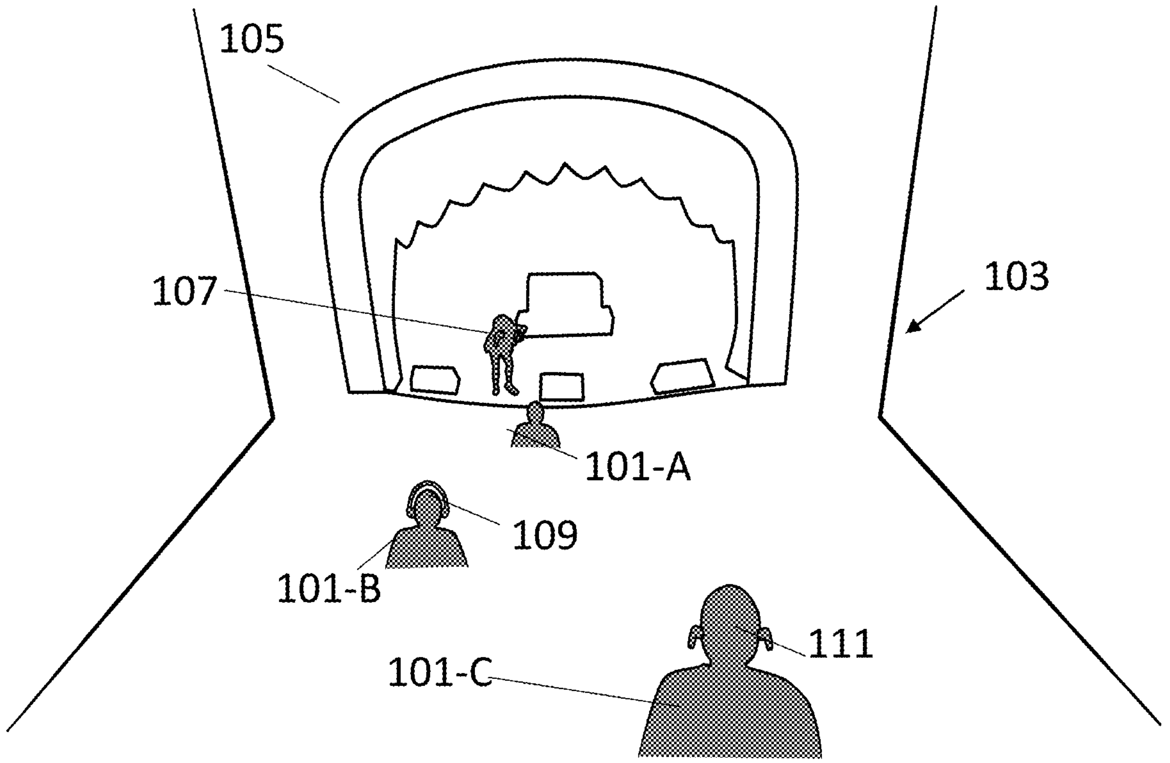
FIG. 1 shows an example use case scenario.

The figures are not necessarily to scale. Certain features and views of the figures can be shown schematically or exaggerated in scale in the interest of clarity and conciseness. For example, the dimensions of some elements in the figures can be exaggerated relative to other elements to aid explication. Corresponding reference numerals are used in the figures to designate corresponding features. For clarity, all reference numerals are not necessarily displayed in all figures.

DETAILED DESCRIPTION

FIG. 1 shows an example use case scenario in which examples of the disclosure could be implemented. FIG. 1 shows listeners 101 in three different locations within a concert venue 103.

The concert venue 103 comprises a stage 105. In this example the stage 105 is located at the front of the concert venue 103. One or more sound sources 107 are located within the concert venue 103. In the example of FIG. 1 the sound source 107 is a singer. Other sound sources could be musical instruments, amplifiers, loudspeakers or other types of sound sources.

In the example of FIG. 1 the sound sources 107 are located on or around the stage 105. In other examples the sound sources 107 could be located in different positions.

For instance, multiple different sound sources 107 could be provided at multiple different locations within the concert venue 103 and/or the sound sources 107 could move within the concert venue 103.

In the example of FIG. 1 three listeners 101 are shown at different locations within the concert venue 103. A first listener 101-A is located close to the stage 105, a second listener 101-B is located in the middle of the concert venue 103 and a third listener 101-C is located at the back if the concert venue 103.

The listeners 101 can listen to acoustic signals at their respective locations. The acoustic signals can originate from the sound sources 107 and/or any other suitable source. There can be different acoustic responses at different locations within the concert venue 103. In the example concert venue 103 shown in FIG. 1 there can be a different acoustic responses for the different locations at which the respective listeners 101 are located. The acoustic response can comprise enhancement or attenuation of a subset of frequencies within the acoustic signals. In some examples the acoustic response can comprise reverberation characteristics. The reverberation characteristic can provide an indication of the proportion of reverberation or ambient sound in the acoustic signal.

The acoustic response can affect the quality of the sound for the listener 101. For example, if low frequencies are enhanced this could result in a booming effect that could be annoying for the listener 101.

The acoustic response at the respective locations can be determined by the geometry of the concert venue 103, the positions of surfaces that can reflect sound, the position of surfaces that can dampen sound and/or any other suitable factor or combination of factors. For instance, in the example of FIG. 1 the acoustic response for a given location of a listener 101 can be determined by the distance from the sound source 107, relative position of the walls and any other surfaces from which acoustic signals could be reflected and/or any other suitable factors.

In the example of FIG. 1 there would be more reverberation at the location of the third listener 101-C compared to the first listener 101-A because the third listener 101-C is further away from the sound sources 107 than the first listener 101-A. This would mean that the first listener 101-A would experience a dryer sound compared to the third listener 101-C.

Also, the example of FIG. 1 the second listener 101-B is positioned between the first listener 101-A and the third listener 101-C and so would experience more reverberation than the first listener 101-A but less than the third listener 101-C.

In the example of FIG. 1 some of the listeners 101-B, 101-C are using listener devices or playback devices that enable audio to be played back to the listeners 101-B, 101-C. In the specific example of FIG. 1 the second listener 101-B is using a head set 109 and the third listener 101-C is using in-ear devices such as earbuds 111.

The listener devices can be configured to process audio that is to be played back to the respective listeners 101. In some examples the listener devices could be used to provide a personalized or improved audio experience. For instance, the listener devices could be configured to provide augmented reality (AR) and/or extended reality (XR) content to the listeners 101. In some examples the listener devices could be used to provide spatial audio to the listeners 101. This could enable the listeners to hear the sound sources 107 from the correct direction relative to their location. In the example of FIG. 1 this could enable the listeners 101 to hear the singer from the correct direction.

In some examples the listener devices could be used for ear protection. In such cases the audio signals, or at least part of the audio signals, can be attenuated, to protect the listener's ears.

In some examples the listener devices can be configured to provide noise control processing such as active noise cancellation or a transparency mode. The noise control processing can detect a sound signal and process the audio signal that is to be played back where the processing is based on the detected sound signal. This can enable unwanted noises to be reduced and can enable wanted sounds to be enhanced.

Although FIG. 1, and subsequent FIGS., show a concert venue 103 with musicians providing the sound sources 107 the examples of the disclosure could be implemented in any environment or venue that comprises one or more sound sources and has different acoustic responses at different locations.

Figure 2:
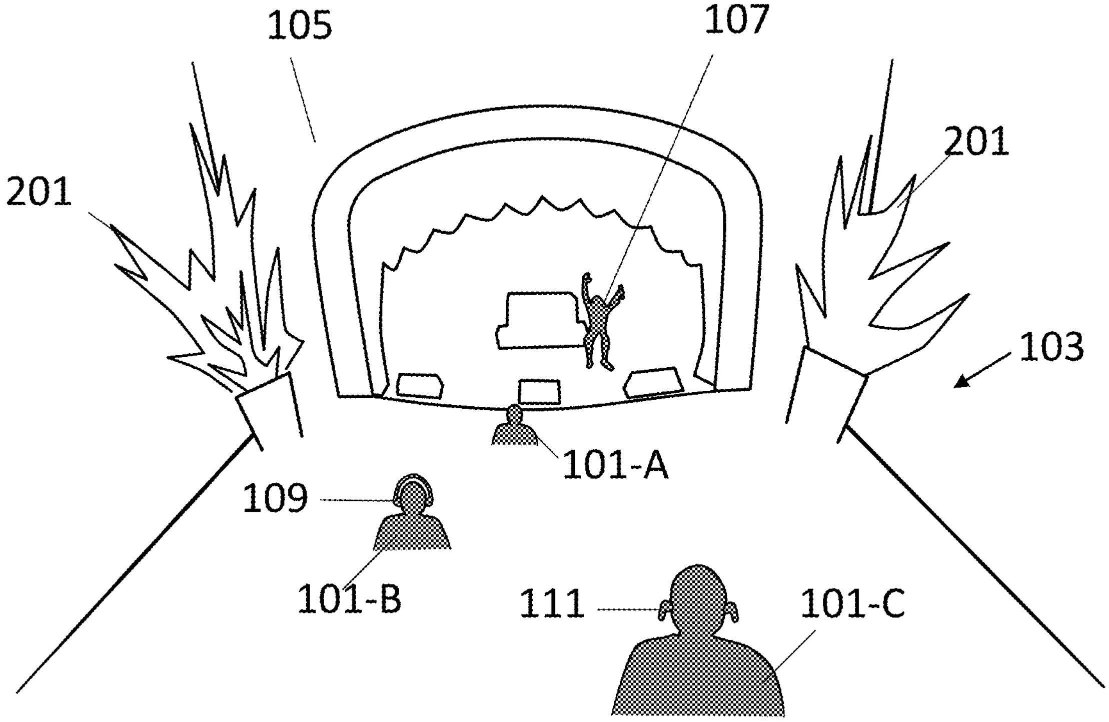
FIG. 2 shows an example use case scenario.

The effects of the reflections and damping of acoustic signals in such environments will normally be constant over time. However, in some circumstances there can be dynamic changes in the acoustic signals. For instance, there could be sudden or temporary loud noises or there could be some quiet periods of time. FIG. 2 shows an example of sudden changes in acoustic signals within the concert venue 103.

In this example pyrotechnics 201 are used. The pyrotechnics 201 comprise large flame or explosions and may be accompanied by loud sounds. In this example the pyrotechnics 201 are located close to the stage 105 and near the other sound sources 107. The pyrotechnics 201 could be in other locations in other examples.

Other changes in the acoustic signals could be used in other examples. For instance, there could be other sources of loud or sudden noises. In some cases, the changes in the acoustic signals could be due to a reduction in the sound level. For instance, there could be parts of the concert that are quiet, such as a gap between songs.

The changes in the can be problematic for listener devices that are using noise control processing.

Figure 3:
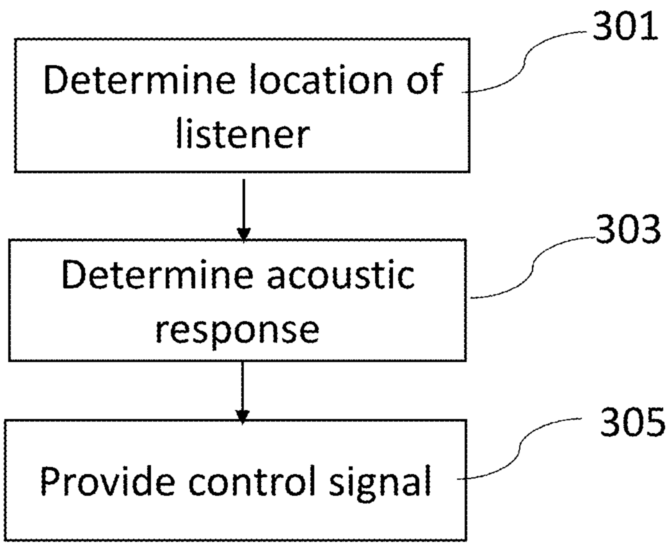
FIG. 3 shows an example method.

FIG. 3 shows an example method according to examples of the disclosure. The method of FIG. 3 could be implemented by a server or rendering device or any other suitable device. The method can be used to provide a control signal to one or more listener devices so that the control signal can be used to improve the noise control processing of a listener device. This could be used in scenarios such as the concert venue 103 shown in FIGS. 1 and 2 or in any other scenario in which there are different acoustic responses at different locations. This enables the server to provide external control of the noise control processing at the listener devices.

At block 301 the method comprises determining a location of a listener 101. The listener 101 can be listening to audio content. The audio content could be provided to the listener 101 by a listener device or a playback device. The listener device or playback device could comprise a head set 109 or earbuds 111 as shown in FIG. 1 or any other suitable type of device.

Any suitable means can be used to determine the location of the listener 101. In some examples the listener device or any other suitable device being used by the listener 101 could comprise one or more sensors that can enable the location of the listener 101 to be determined. Information indicative of this location could then be sent to the server using any suitable communication means.

The location of the listener 101 could comprise a position of a listener 101 within an environment such as a concert venue 103. This could comprise a position within a grid or coordinate system. In some examples the location of the listener 101 could comprise an orientation of the listener 101. The orientation can be an indication of the direction that the listener 101 is facing.

The audio content that the listener 101 is listening to can be processed using noise control processing. The noise control processing can comprise active noise cancellation (ANC) processing, transparency mode processing, or any other suitable type of processing. The noise control processing can be performed on an electrical audio signal before the electrical audio signal is rendered and provide for playback by the listener device or playback device.

At block 303 the method comprises determining an acoustic response at the location of the listener 101. The environment comprising the location of the listener 101 could be a concert venue 103 as shown in FIGS. 1 and 2 or could be any other suitable type of environment that comprises sound sources and has different acoustic responses at different locations.

The acoustic response can comprise any boosts or attenuation for certain frequencies that affects how the user perceives the audio content. In some examples the acoustic response can comprise reverberation characteristics. The reverberation characteristics can comprise an amount of reverberation within acoustic signals at a particular location.

Any suitable means can be used to determine the acoustic response at a location of the listener 101. In some examples the acoustic response at a location of the listener 101 can be determined from a model of an environment comprising the location of the listener 101, measurements made at the location of the listener 101, and/or any other suitable means. A model of the environment could be stored at the server or stored in a location that is accessible by the server. In examples where measurements are used, the measurements could be made by a device such as a listener device and then the results of the measurements could be sent to the server using any suitable communication means.

At block 305 the method comprises providing a control signal. The control signal can be provided to the listener device or playback device that is being used by the listener 101. The control signal indicates an adjustment for one or more parameters of the noise control processing. The adjustment is based, at least in part, on the acoustic response at the location of the listener 101.

The parameters that are adjusted by the control signal can be any parameters that change the audio content provided to the listener. The parameters of the noise control processing that are adjusted can comprise level, cross over frequency, or any other suitable parameter or combinations of parameters. The parameters of the noise control processing can be adjusted to provide improved audio to the listener 101. The audio can be improved by removing unwanted or annoying effects caused by the acoustic characteristics at the listener's location. For instance, the changes in the noise control processing can enable the removal of an unwanted or unpleasant echo and the replacement of this with a more pleasant synthetic echo.

In some examples the method can also comprise providing a control signal indicating a temporary adjustment of the one or more parameters of the noise control processing.

The temporary adjustment can be based on a change in one or more characteristics of the audio content. The change in the audio content could be due to a change in the acoustic signals provided by the sound sources within the listener's environment and/or any other suitable factor.

The control signal indicating a temporary adjustment of the one or more parameters can be sent in a different signal to the control signal that provides an adjustment based on the location of the listener 101. This can enable the control signal indicating a temporary adjustment of the one or more parameters to be sent at a different time to the control signal that provides an adjustment based on the location of the listener 101.

For instance, the control signal that provides an adjustment based on the location of the listener 101 will not change very often and might only need to be sent once whereas a control signal indicating a temporary adjustment of the one or more parameters could be sent whenever there is a change in the characteristics of the audio content.

The characteristics of the audio content that are changed could comprise a loudness level, a location of a sound source or any other suitable characteristic or combination of characteristics.

In some cases, the change in the characteristics could be an abrupt or sudden change. For instance, a pyrotechnic effect would create a very sudden increase in sound levels.

The adjustment to the parameters can be temporary in that they last for a limited duration of time. The adjustment to the parameters can last for the duration of the change in the one or more characteristics of the audio content or could last for any other suitable duration.

In some examples the temporary adjustments of the parameters of the noise control processing can be made based on detected changes in one or more characteristics of the audio content. For instance, one or more microphones can be located in the environment and these can detect the changes in the audio content. These could detect a sudden increase in volume, a decrease in volume or any other changes in the characteristics.

In some examples the temporary adjustments of the parameters of the noise control processing can be made based on expected or predetermined changes in one or more characteristics of the audio content. For instance, the timing of effects such as pyrotechnics 201 or any other events within a concert or venue could be known by the server. This information could then be used to generate the temporary adjustments of the parameters of the noise control processing to coincide with the timing of the changes in the audio content.

In some examples the control signal can indicate that the one or more parameters of the noise control processing are to be adjusted for all of the frequencies of the audio content. In some examples the control signal can indicate that the one or more parameters of the noise control processing are to be adjusted for a subset of frequencies of the audio content. In such examples the relevant subset of frequencies can be indicated. If the parameters are to be adjusted for a subset of the frequencies, then the adjustments can be made for some frequencies but not for others. For example, attenuation could be increased for low frequencies but there could be no change for high frequencies.

The server device or rendering device could be configured to provide multiple control signals to multiple different listener devices. The control signals can be different for the different listener devices to take into account any differences in location of the listeners 101.

In some cases, the control signal could comprise information relating to additional processing for the audio. This can indicate additional processing that can be performed by the listener device to improve the audio quality for the listener 101. The additional processing can be performed in addition to the noise control processing. The additional processing could comprise the introduction of synthetic reverberation or any other suitable processing.

Figure 4:
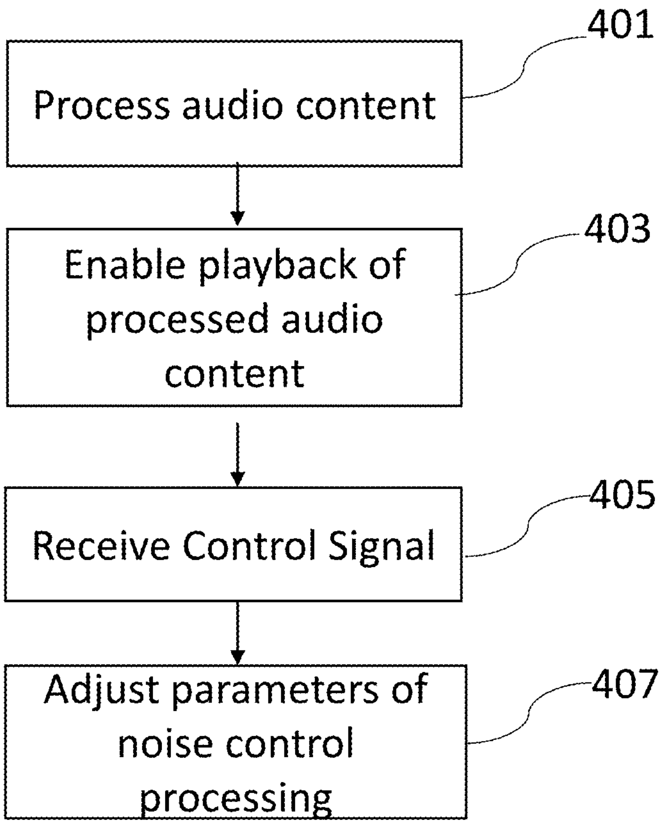
FIG. 4 shows an example method.

FIG. 4 shows an example method according to examples of the disclosure. The method of FIG. 4 could be implemented by a listener device or a playback device or any other suitable type of device. The device can be configured to process and audio signal and enable the processed audio signal to be played back to a listener so that the listener can hear it. The device could be headphones 109, earbuds 111 or any other suitable type of device. The device could be used by a listener 101 such as the listeners 101 shown in FIGS. 1 and 2.

At block 401 the method comprises processing audio content using noise control processing. The noise control processing can comprise active noise cancellation (ANC) processing, transparency mode processing, or any other suitable type of processing. The noise control processing can be performed on an electrical audio signal before the electrical audio signal is rendered and provide for playback by the listener device.

At block 403 the method comprises enabling playback of the processed audio content to a listener 101. The processed audio signal can be provided to a speaker in the listener device for playback so that a listener 101 can hear the audio.

At block 405 the method comprises receiving a control signal from another device. The another device could be a server or rendering device. The another device could be configured to perform the method of FIG. 3 or any other suitable method. The another device can be external to the listener device.

The control signal that is received indicates adjustments for the one or more parameters of the noise control processing.

The control signal is configured to enable the parameters of the noise control processing to be adjusted based, at least in part, on the acoustic response at a location of the listener 101.

At block 407 the method comprises adjusting the parameters of the noise control processing based at least in part on the received control signal. The noise control processing with the adjusted parameters can then be used to process the audio content. The adjusted parameters as indicated in the control signal can be used to replace the parameters of the control signal that were being used initially.

In some examples the control signal can be configured to adjust the parameters of the noise control processing based, at least in part, on the acoustic response at a location of the listener.

In some examples the method can also comprise receiving a control signal from the another device wherein the control signal indicates a temporary adjustment for the one of more parameters of the noise control processing The temporary adjustments for the noise control processing can be based on a change in one or more characteristics of the audio content.

The control signal indicating a temporary adjustment of the parameters can be received in a different signal to the control signal that provides an adjustment based on the location of the listener 101. This can enable the control signal indicating a temporary adjustment of the one or more parameters to be received at a different time to the control signal that provides an adjustment based on the location of the listener 101. For instance, the control signal that provides an adjustment based on the location of the listener 101 will not change very often and might only need to be sent once whereas a control signal indicating a temporary adjustment of the one or more parameters could be received whenever there is a change in the characteristics of the audio content.

In some cases, the control signal could comprise information relating to additional processing for the audio. This can indicate additional processing that can be performed by the listener device to improve the audio quality for the listener 101. The additional processing can be performed in addition to the noise control processing. The additional processing could comprise the introduction of synthetic reverberation or any other suitable processing. In such cases the listener device can be configured to perform the additional processing in accordance with the instructions in the control signal.

Figure 5:
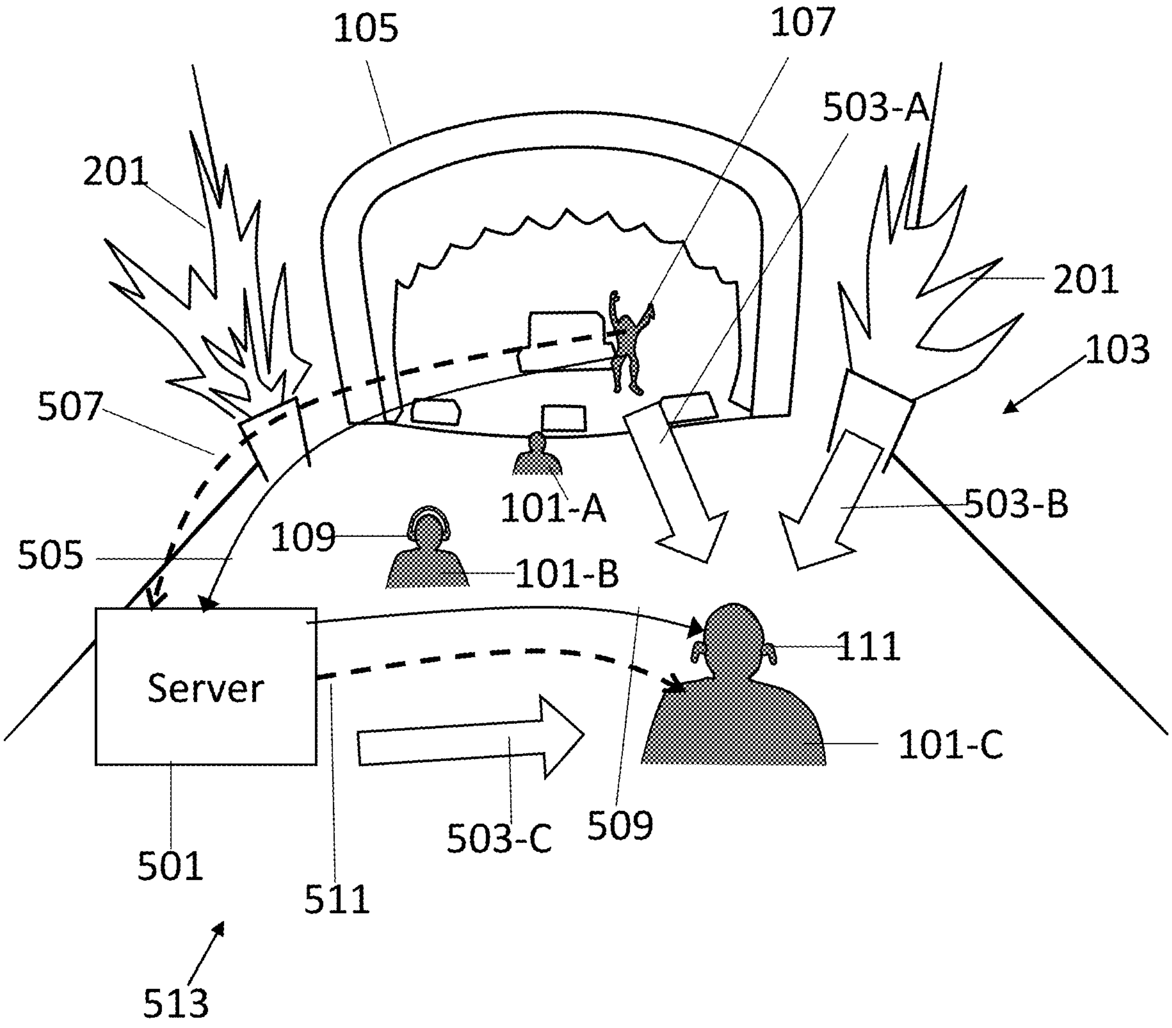
FIG. 5 shows an example system.

FIG. 5 shows an example system 513 that can be used to implement examples of the disclosure. In this example the system 513 is used in concert venue 103 as shown in FIGS. 1 and 2. Example systems 513 could be used in other venues or environments.

In the example of FIG. 5 various acoustic signals 503 can arrive at a listener 101. Three main acoustic signals 503 are shown in FIG. 5. In this case the sound sources 107 on the stage 105 provide the first acoustic signal 503-A, the pyrotechnics 201 provide the second acoustic signal 503-B and reverberation or other ambient sounds provide the third acoustic signal 503-C. The respective levels of each of these acoustic signals 503 will be different at different locations within the concert venue 103.

The reverberations can comprise two parts where the first part comprises early reflections and the second part comprises late reverberation. The early reflections are created by sound waves reflecting off surfaces and they arrive relatively soon after the direct acoustic signals. The late reverberations are generated as the acoustic signals continue to reflect off more surfaces and are more complex to compute than the early reflections. The early reflections and late reverberations create psycho-acoustic understanding of the concert venue 103 for the respective listeners 101 in their respective locations.

In this example the system 513 comprises a server 501. In this example the server can be configured to render the audio signals received by the server 501. The rendered signal can then be provided to a listener device for playback. The server 501 can therefore provide the function of a rendering device.

The server 501 receives an audio stream 505 for the sound sources 107 in the concert venue 103. In this case the audio stream 505 will comprise audio from the singer and any other sounds sources 107 in the concert. The server 501 can also receive control data 507 relating to the sound sources 107. The control data 507 can comprise information indicating a desired listener 101 experience. For instance, it can indicate a desired amount of reverberation or other parameter within the audio that is to be provided to the listener 101.

The control data 507 could comprise information relating to expected timings for changes in the acoustic signals from the sound sources 107. For instance, the control data 507 could indicate when quiet periods are expected or the timing of any loud effects such as pyrotechnics 201. In some examples the control data 507 could comprise information relating to changes in directional sound. This could be the appearance of a new sound source, 107. For instance, a new performer could be expected to enter the stage 105. This control data 507 can enable adjustments in the noise control processing to be made pre-emptively.

The server 501 can also determine the parameters that should be used for noise control processing at different locations within the concert venue 103 to take into account the acoustic response at the respective locations. The server 501 can receive information indicative of a listeners 101 location from a listener device or from any other suitable source. This information can then be used by the server 501 to determine suitable parameters for the noise control processing at thar location.

The server 501 can use the control data 507 to determine the parameters that should be used for noise control processing to adjust for the location of the listener 101. For instance, if the control data 507 indicates an ideal amount of reverberation this can be compared to the expected amount of reverberation at the listeners location. The appropriate parameters to adjust the noise control processing to increase or decrease the reverberation so as to achieve, or substantially achieve, the ideal effects can then be determined. For example, transparency can be increased and/or ANC can be increased. In some examples the headphone 109 or other suitable device could render audio from a server where the audio comprises less reverberation.

The server 501 can use the control data 507 to determine the parameters that should be used for noise control processing to adjust for changes in the characteristics of the audio content. For instance if a sudden increase in volume is expected, for example pyrotechnics 201 or other effects, then the noise control parameters could be adjusted to provide a slower ramp up of the level for a transparency mode. If a new sound source is expected, for instance if a new performer is expected to arrive on the stage 105 then the noise control parameters could be adjusted to allow more pass through and provide for smoother mixing of the new sound source 107.

The server 501 is configured to provide an audio stream 509 to a listener device. In the example of FIG. 5 one audio stream 509 is shown and is provided to the earbuds 111 of the third listener 101-C. Other audio streams 509 could be provided to the devices of other listeners within the concert venue 103.

The audio streams 509 can be rendered for the location of the listener 101. For example, the audio stream can be configured to provide spatial audio effects to correspond to the location of the listener 101.

The server 501 is also configured to provide a control signal 511 to the listener device. The control signal 511 can comprise an indication of the adjustment for the parameters of the control signal. The adjustment can be based on the location of the listener 101 and/or on any changes in the acoustic signals 503 that reach the listener.

When the listener device receives the audio stream 509 and the control signal 511 the listener device adjusts the parameters of the noise control processing in accordance with the control signal 511. The adjusted parameters of the noise control processing are then used to process the audio stream 509 before it is played back to the listener 101.

Only one control signal 511 is shown in FIG. 5 however the server 501 can be configured to provide multiple audio streams 509 and control signals 511. Different control signals 511 and/or audio streams 509 are provided to different listeners 101 in different locations. This can enable multiple listeners 101 to make use of the external control for the noise control processing.

In the example of FIG. 5 the server 501 receives control data 507 that enables preemptive adjustments in the noise control processing. In some cases, the changes in the acoustic characteristics might not be pre-planned. For instance, there could be an unexpected loud noise such as cheer from the crowd or a problem with some equipment could result in an unexpected quiet phase. In such scenarios the changes could be detected by one or more microphones. The microphones could be located anywhere within the concert venue 103 or other environment. The microphones could provide information to the server 501 indicating the change in the acoustic signals. This information could then be used to determine how the parameters of the noise control processing should be adjusted and enable an appropriate control signal 511 to be provided.

Figure 6A:
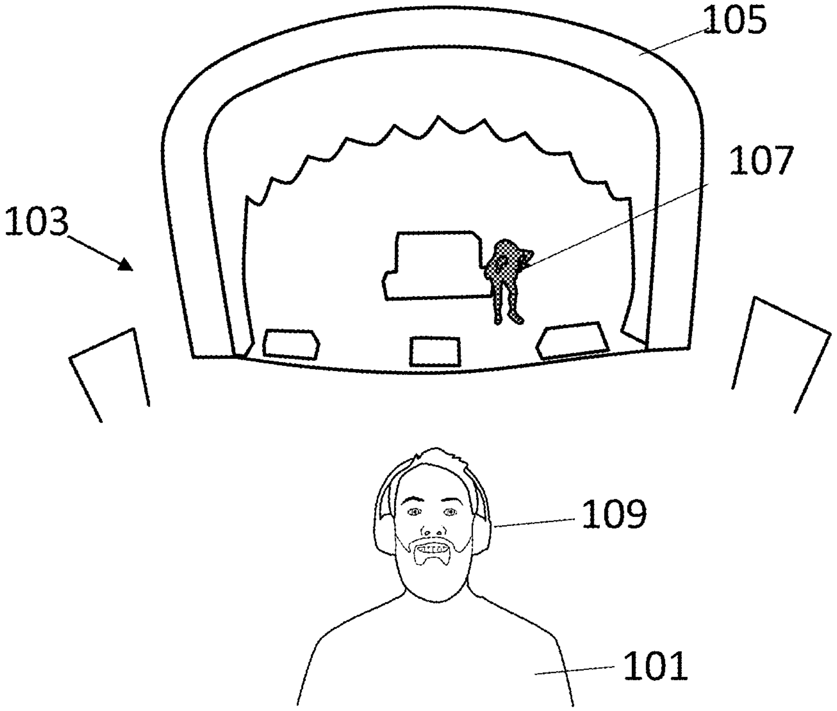
FIGS. 6A and 6B show an example use case scenario.
Figure 6B:
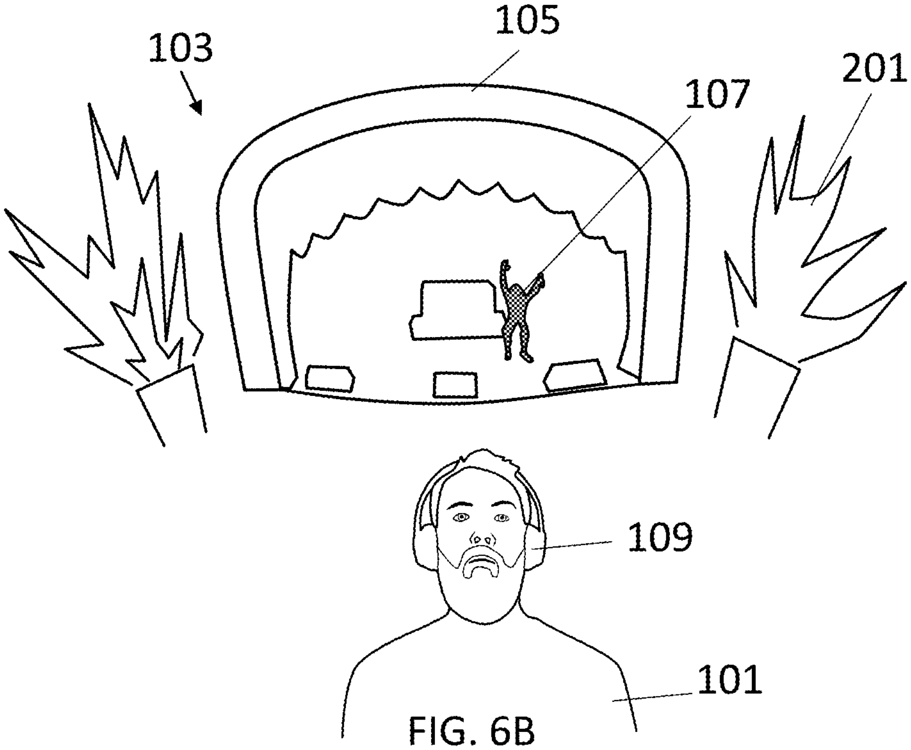

FIGS. 6A and 6B show an example use case scenario in which examples of the disclosure are not used. In this example a listener 101 is in the concert venue 103 and is using headphones 109. The headphones 109 can be used to provide AR/XR or could be used for noise cancelling or could be used for any other suitable purpose.

The headphones 109 receive an audio stream that can be played back for the listener 101. The audio stream can be processed using noise control processing such as ANC or any other suitable type of noise control processing.

In FIG. 6A the sound environment is relatively stable with no sudden changes in the characteristics of the acoustic signals. In this case the noise control processing can provide a good balance and the listener 101 is happy.

In FIG. 6B the sound environment is unstable with sudden changes in the characteristics of the acoustic signals. In this case the sudden changes are caused by the pyrotechnics 201. This causes the noise control processing to fluctuate and the listener 101 will hear undesirably loud noises. This could be harmful to the listener's 101 ears if the sound is very loud. In this case the listener 101 is unhappy.

Figure 7A:
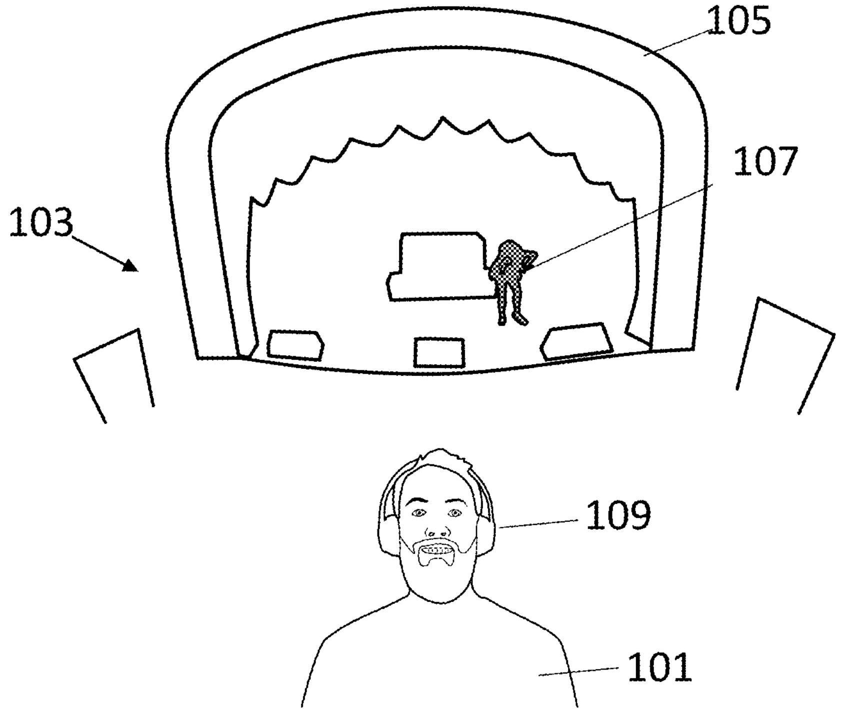
FIGS. 7A and 7B show an example use case scenario.
Figure 7B:
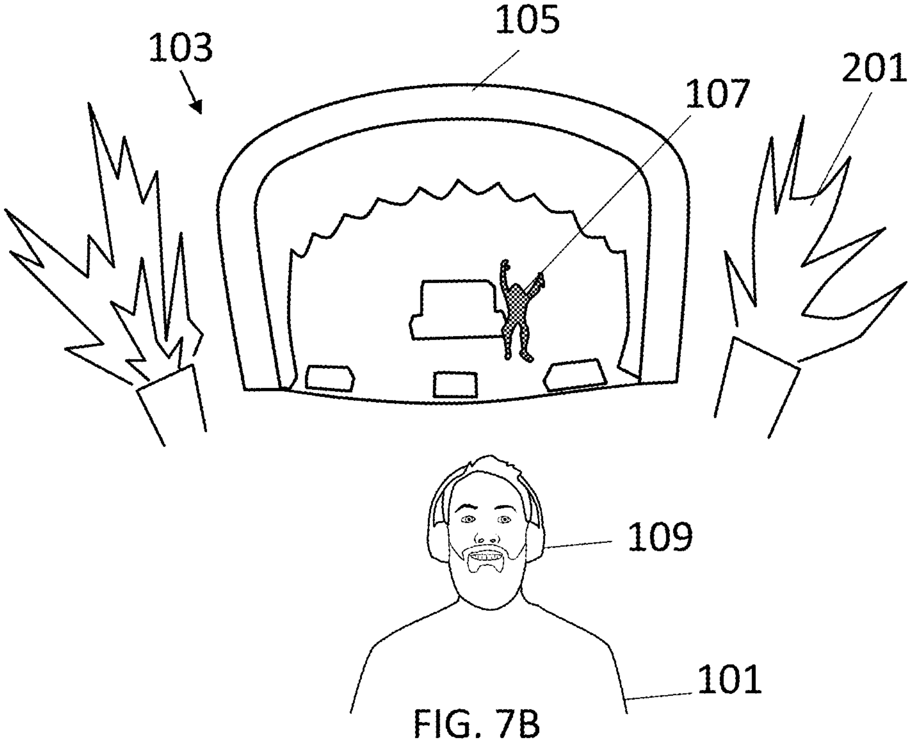

FIGS. 7A and 7B show another example use case scenario. This is similar to that shown in FIGS. 6A and 6B except that in FIGS. 7A and 7B examples of the disclosure are used. In FIGS. 7A and 7B a listener 101 is in the concert venue 103 and is using headphones 109. The headphones 109 can be used to provide AR/XR or could be used for noise cancelling or could be used for any other suitable purpose.

The headphones 109 receive an audio stream that can be played back for the listener 101. The audio stream can be processed using noise control processing such as active noise cancellation (ANC) or any other suitable type of noise control processing.

In FIG. 7A the sound environment is relatively stable with no sudden changes in the characteristics of the acoustic signals. In this case the noise control processing can provide a good balance and the listener 101 is happy.

In FIG. 7B the sound environment is unstable with sudden changes in the characteristics of the acoustic signals. In this case the sudden changes are caused by the pyrotechnics 201.

In this case the sudden changes can be preempted or measured and a control signal 511 can be provided to the headphones 109. The control signal 511 can be provided by a wired or wireless communication link. The communication link can enable the control signal 511 to travel at the speed of light. This can enable the control signal 511 to be provided to the listener device before the acoustic signal 503 reaches the listener 101. This can enable the noise control processing to be adapted instantaneously before any loud or unpleasant sounds are provided to the listener 101.

In this case the listener 101 is happy because the quality of their audio experience is maintained and they do not experience any unwanted loud noises.

Figure 8A:
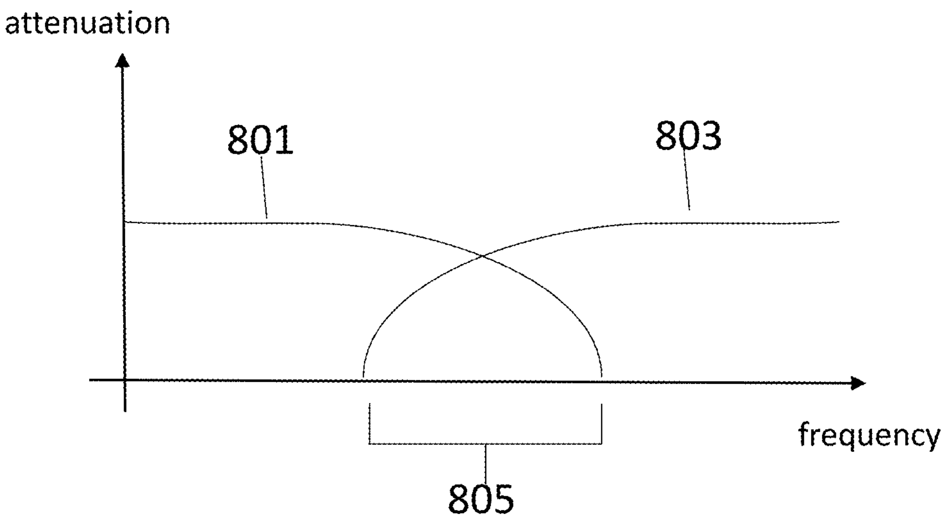
FIGS. 8A to 8C show example parameters of noise control processing.
Figure 8B:
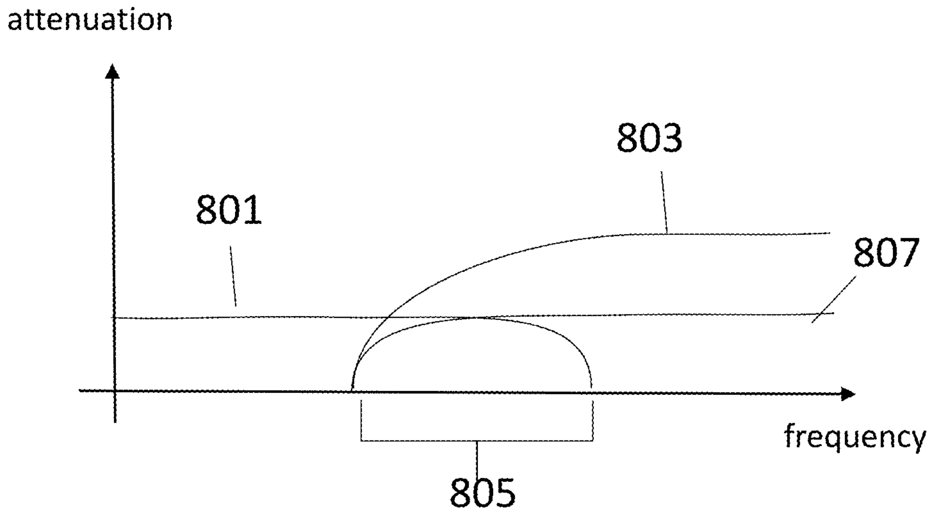
Figure 8C:
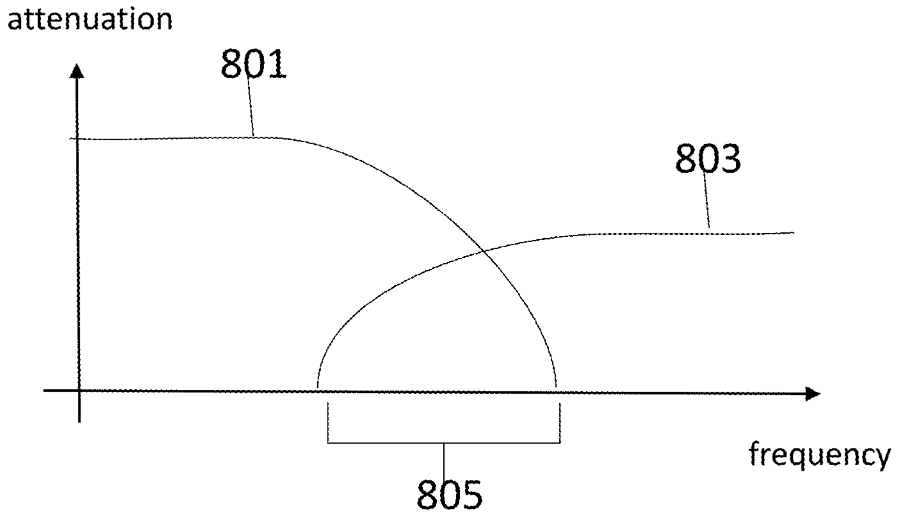

FIGS. 8A to 8C show example parameters of noise control processing. FIGS. 8A to 8C show plots of attenuation that is used for respective frequencies.

FIGS. 8A and 8B show parameters of noise control processing that could be used without examples of the disclosure.

FIG. 8A shows parameters for noise control processing such as active noise cancellation (ANC). ANC can be used to keep the attenuation and/or amplification that listener devices impose on external sound sources flat or substantially flat. The attenuation and/or amplification can be kept approximately the same for all frequencies. The listener devices can be configured to attenuate high frequencies passively and low frequencies actively and the low frequency active attenuation is typically kept at approximately the same level as the high frequency passive attenuation.

In FIG. 8A plot 801 shows the active attenuation for low frequencies and plot 803 shows the passive attenuation for high frequencies. The region 805 shows the cross over frequency range. The cross over frequency range is the range at which the switch between active attenuation and passive attenuation occurs. The switch can occur slowly or gradually.

FIG. 8B shows parameters for noise control processing such a transparency mode. In this example the listener device can be configured to reduce active attenuation at low frequencies and counter passive high frequency attenuation by playing external sounds from the speakers of the listener device.

In FIG. 8B plot 801 shows the active attenuation for low frequencies and plot 803 shows the passive attenuation for high frequencies. The region 805 shows the cross over frequency range and the plot 807 shows the transparency signal.

FIG. 8C show parameters of noise control processing that could be used with examples of the disclosure. In FIG. 8C plot 801 shows the active attenuation for low frequencies and plot 803 shows the passive attenuation for high frequencies. The region 805 shows the cross over frequency range.

In the example of FIG. 8C the active attenuation for the low frequencies is increased.

The active attenuation for the low frequencies is increased to a level beyond normal operation levels. In this case the active attenuation for the low frequencies is at a higher level than the passive attenuation for the high frequencies. This could be a suitable change in the parameters when there is an increase in low frequencies. For instance, an explosion or pyrotechnic effect could cause a low frequency boost.

Other changes in the parameters could be made in other examples, for instance the attenuation could be decreased, the cross over frequency range could be moved or any other suitable changes could be made.

Examples of the disclosure therefore provide improved experience for a listener 101 by optimizing, or substantially optimizing, the playback of audio content at different locations within a concert venue 103 or any other suitable environment. This can be achieved through the use of the external control signals. The listener 101 experience, and also listener 101 safety, can also be improved by adapting the processing of the audio content during significant changes in acoustic characteristics such as a sudden change in loudness. In some cases the changes in the processing can be performed pre-emptively.

Figure 9:
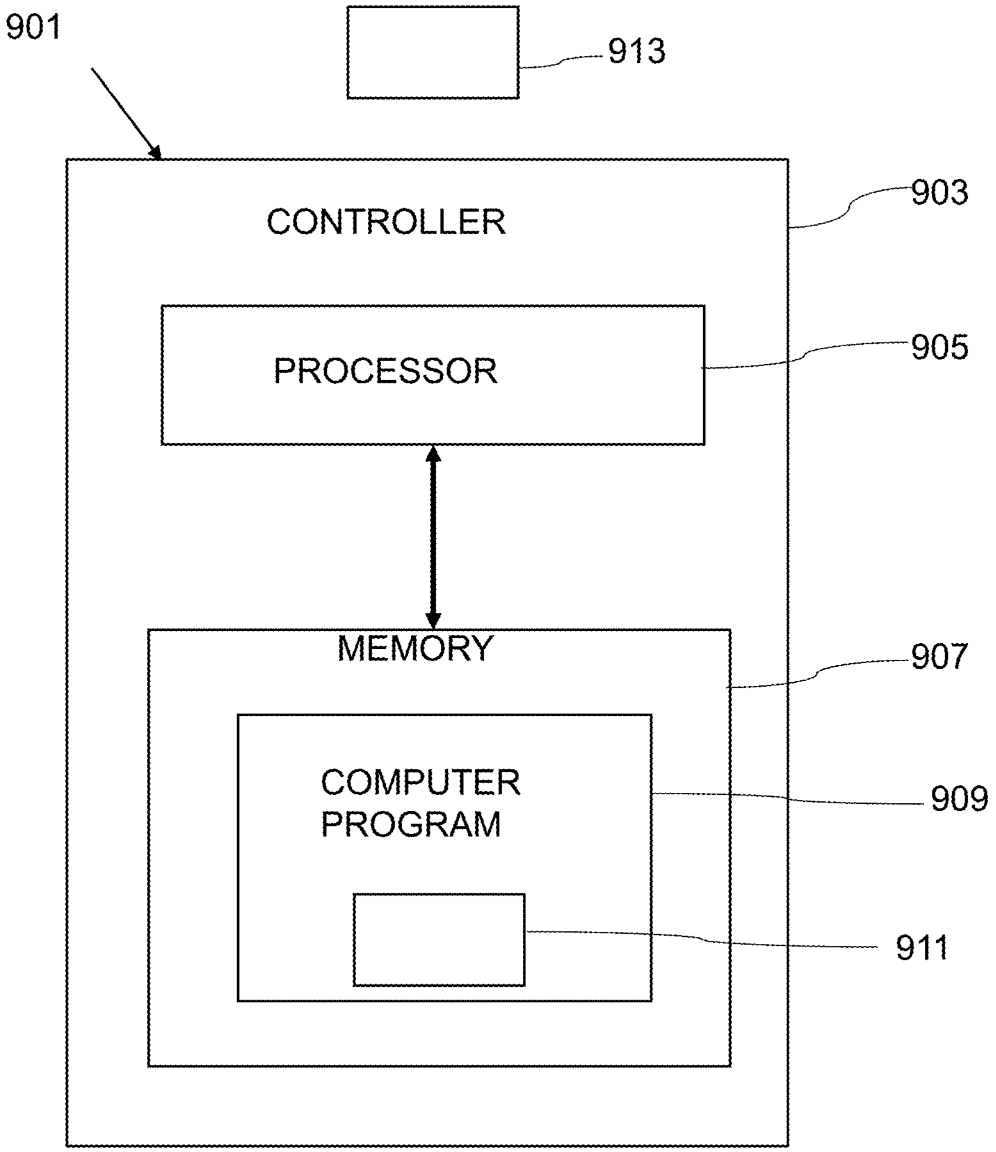
FIG. 9 shows an example apparatus.

FIG. 9 schematically illustrates an apparatus 901 that can be used to implement examples of the disclosure. In this example the apparatus 901 comprises a controller 903. The controller 903 can be a chip or a chip-set. The apparatus 901 can be provided within a device such as a server or rendering device. In some examples the apparatus 901 could be provided within a listener device or playback device.

In the example of FIG. 9 the implementation of the controller 903 can be as controller circuitry. In some examples the controller 903 can be implemented in hardware alone, have certain aspects in software including firmware alone or can be a combination of hardware and software (including firmware).

As illustrated in FIG. 9 the controller 903 can be implemented using instructions that enable hardware functionality, for example, by using executable instructions of a computer program 909 in a general-purpose or special-purpose processor 905 that may be stored on a computer readable storage medium (disk, memory etc.) to be executed by such a processor 905.

The processor 905 is configured to read from and write to the memory 907. The processor 905 can also comprise an output interface via which data and/or commands are output by the processor 905 and an input interface via which data and/or commands are input to the processor 905.

The memory 907 stores a computer program 909 comprising computer program instructions (computer program code 911) that controls the operation of the controller 903 when loaded into the processor 905. The computer program instructions, of the computer program 909, provide the logic and routines that enables the controller 903. to perform the methods illustrated in the accompanying FIGS. The processor 905 by reading the memory 907 is able to load and execute the computer program 909.

In examples where the apparatus 901 is provided within a server or rendering device the apparatus 901 comprises:

at least one processor 905; and at least one memory 907 storing instructions that, when executed by the at least one processor 905, cause the apparatus 901 at least to perform:

determining 301 a location of a listener 101 wherein the listener 101 is listening to audio content and the audio content is processed using noise control processing;

determining 303 an acoustic response at the location of the listener 101; and providing 305 a control signal wherein the control signal indicates an adjustment for one or more parameters of the noise control processing, and wherein the adjustment is based, at least in part, on the acoustic response at the location of the listener 101.

In examples where the apparatus 901 is provided within a listener device or playback device the apparatus 901 comprises:

at least one processor 905; and at least one memory 907 storing instructions that, when executed by the at least one processor 905, cause the apparatus 901 at least to perform:

processing 401 audio content using noise control processing;

enabling 403 playback of the processed audio content to a listener 101;

receiving 405 a control signal from another device wherein the control signal indicates adjustments for the one or more parameters of the noise control processing, and wherein the adjustment is based, at least in part, on an acoustic response at the location of the listener 101; and adjusting 407 the one or more parameters of the noise control processing based at least in part on the received control signal.

As illustrated in FIG. 9, the computer program 909 can arrive at the controller 903 via any suitable delivery mechanism 913. The delivery mechanism 913 can be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid-state memory, an article of manufacture that comprises or tangibly embodies the computer program 909. The delivery mechanism can be a signal configured to reliably transfer the computer program 909. The controller 903 can propagate or transmit the computer program 909 as a computer data signal. In some examples the computer program 909 can be transmitted to the controller 903 using a wireless protocol such as Bluetooth, Bluetooth Low Energy, Bluetooth Smart, 6LoWPan (IP$_v$6 over low power personal area networks) ZigBee, ANT+, near field communication (NFC), Radio frequency identification, wireless local area network (wireless LAN) or any other suitable protocol.

In examples where the apparatus 901 is provided within a server or rendering device the computer program 909 comprises computer program instructions for causing an apparatus 901 to perform at least the following or for performing at least the following:

determining 301 a location of a listener 101 wherein the listener 101 is listening to audio content and the audio content is processed using noise control processing;

determining 303 an acoustic response at the location of the listener 101; and providing 305 a control signal wherein the control signal indicates an adjustment for one or more parameters of the noise control processing, and wherein the adjustment is based, at least in part, on the acoustic response at the location of the listener 101.

In examples where the apparatus 901 is provided within a listener device or playback device the computer program 909 comprises computer program instructions for causing an apparatus 901 to perform at least the following or for performing at least the following:

processing 401 audio content using noise control processing;

enabling 403 playback of the processed audio content to a listener 101;

receiving 405 a control signal from another device wherein the control signal indicates adjustments for the one or more parameters of the noise control processing, and wherein the adjustment is based, at least in part, on an acoustic response at the location of the listener 101; and adjusting 407 the one or more parameters of the noise control processing based at least in part on the received control signal.

The computer program instructions can be comprised in a computer program 909, a non-transitory computer readable medium, a computer program product, a machine readable medium. In some but not necessarily all examples, the computer program instructions can be distributed over more than one computer program 909.

Although the memory 907 is illustrated as a single component/circuitry it can be implemented as one or more separate components/circuitry some or all of which can be integrated/removable and/or can provide permanent/semi-permanent/dynamic/cached storage.

Although the processor 905 is illustrated as a single component/circuitry it can be implemented as one or more separate components/circuitry some or all of which can be integrated/removable. The processor 905 can be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' may refer to one or more or all of the following:

(a) hardware-only circuitry implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory or memories that work together to cause an apparatus, such as a mobile phone or server, to perform various functions and (c) hardware circuit(s) and or processor(s), such as a microprocessor(s) or a portion of a microprocessor(s), that requires software (for example, firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

The blocks illustrated in FIGS. 3 and 4 can represent steps in a method and/or sections of code 911 in the computer program 909. The illustration of a particular order to the blocks does not necessarily imply that there is a required or preferred order for the blocks and the order and arrangement of the blocks can be varied. Furthermore, it can be possible for some blocks to be omitted.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this description, the wording 'connect', 'couple' and 'communication' and their derivatives mean operationally connected/coupled/in communication. It should be appreciated that any number or combination of intervening components can exist (including no intervening components), i.e., so as to provide direct or indirect connection/coupling/communication. Any such intervening components can include hardware and/or software components.

As used herein, the term "determine/determining" (and grammatical variants thereof) can include, not least: calculating, computing, processing, deriving, measuring, investigating, identifying, looking up (for example, looking up in a table, a database or another data structure), ascertaining and the like. Also, "determining" can include receiving (for example, receiving information), accessing (for example, accessing data in a memory), obtaining and the like. Also, "determine/determining" can include resolving, selecting, choosing, establishing, and the like.

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term 'a', 'an' or 'the' is used in this document with an inclusive not an exclusive meaning. That is any reference to X comprising a/an/the Y indicates that X may comprise only one Y or may comprise more than one Y unless the context clearly indicates the contrary. If it is intended to use 'a', 'an' or 'the' with an exclusive meaning then it will be made clear in the context. In some circumstances the use of 'at least one' or 'one or more' may be used to emphasis an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

The above description describes some examples of the present disclosure however those of ordinary skill in the art will be aware of possible alternative structures and method features which offer equivalent functionality to the specific examples of such structures and features described herein above and which for the sake of brevity and clarity have been omitted from the above description. Nonetheless, the above description should be read as implicitly including reference to such alternative structures and method features which provide equivalent functionality unless such alternative structures or method features are explicitly excluded in the above description of the examples of the present disclosure.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

We claim:

1. An apparatus comprising:

at least one processor; and at least one memory storing instructions that, when executed by the at least one processor, cause the apparatus at least to:

determine a location of a listener wherein the listener is listening to audio content and the audio content is processed using noise control processing, wherein the noise control processing comprises active noise cancellation;

determine an acoustic response at the location of the listener; and provide a control signal, wherein the control signal indicates an adjustment for one or more parameters of the noise control processing, and wherein the adjustment is based, at least in part, on the acoustic response at the location of the listener.

2. The apparatus as claimed in claim 1, wherein the acoustic response at the location of the listener is determined from at least one of:

a model of an environment comprising the location of the listener; or measurements made at the location of the listener.

3. The apparatus as claimed in claim 1, wherein the acoustic response comprises, at least, reverberation characteristics.

4. The apparatus as claimed in claim 1, wherein the apparatus is further caused to:

provide a control signal indicating a temporary adjustment of the one of more parameters of the noise control processing, wherein the temporary adjustment is based on a change in one or more characteristics of the audio content.

5. The apparatus as claimed in claim 4, wherein the temporary adjustment of the one of more parameters of the noise control processing is based on detected changes in the one or more characteristics of the audio content.

6. The apparatus as claimed in claim 1, wherein the one or more parameters of the noise control processing are adjusted for a subset of frequencies of the audio content.

7. The apparatus as claimed in claim 1, wherein the one or more parameters of the noise control processing that are adjusted comprise at least one of:

level; or cross over frequency.

8. An electronic device comprising the apparatus as claimed in claim 1, wherein the electronic device comprises at least one of:

a server; or a rendering device.

9. A method comprising:

determining a location of a listener wherein the listener is listening to audio content and the audio content is processed using noise control processing, wherein the noise control processing comprises active noise cancellation;

determining an acoustic response at the location of the listener; and providing a control signal, wherein the control signal indicates an adjustment for one or more parameters of the noise control processing, wherein the adjustment is based, at least in part, on the acoustic response at the location of the listener.

10. The method as claimed in claim 9, wherein the acoustic response at the location of the listener is determined from at least one of:

a model of an environment comprising the location of the listener; or measurements made at the location of the listener.

11. The method as claimed in claim 9, wherein the acoustic response comprises, at least, reverberation characteristics.

12. The method as claimed in claim 9, further comprising:

providing a control signal indicating a temporary adjustment of the one of more parameters of the noise control processing, wherein the temporary adjustment is based on a change in one or more characteristics of the audio content.

13. The method as claimed in claim 12, wherein the temporary adjustment of the one of more parameters of the noise control processing is based on detected changes in the one or more characteristics of the audio content.

14. The method as claimed in claim 9, wherein the one or more parameters of the noise control processing are adjusted for a subset of frequencies of the audio content.

15. The method as claimed in claim 9, wherein the one or more parameters of the noise control processing that are adjusted comprise at least one of:

level; or cross over frequency.

16. A non-transitory computer readable medium comprising instructions stored thereon for performing at least the following:

determining a location of a listener wherein the listener is listening to audio content and the audio content is processed using noise control processing, wherein the noise control processing comprises active noise cancellation;

determining an acoustic response at the location of the listener; and providing a control signal, wherein the control signal indicates an adjustment for one or more parameters of the noise control processing, wherein the adjustment is based, at least in part, on the acoustic response at the location of the listener.

17. The non-transitory computer readable medium as claimed in claim 16, wherein the acoustic response at the location of the listener is determined from at least one of:

a model of an environment comprising the location of the listener; or measurements made at the location of the listener.

18. The non-transitory computer readable medium as claimed in claim 16, wherein the acoustic response comprises, at least, reverberation characteristics.

19. The non-transitory computer readable medium as claimed in claim 16, further comprising instructions for performing:

providing a control signal indicating a temporary adjustment of the one of more parameters of the noise control processing, wherein the temporary adjustment is based on a change in one or more characteristics of the audio content.

20. The non-transitory computer readable medium as claimed in claim 19, wherein the temporary adjustment of the one of more parameters of the noise control processing is based on detected changes in the one or more characteristics of the audio content.

* * * * *